Nov. 8, 1955  O. G. SCHWEDE  2,722,862
ANGULAR DISCRIMINATING OPTICAL DEVICE
Filed Sept. 12, 1949  3 Sheets-Sheet 1

INVENTOR.
OTTO G. SCHWEDE
BY M. A. Hayes
ATTORNEY

Nov. 8, 1955     O. G. SCHWEDE     2,722,862
ANGULAR DISCRIMINATING OPTICAL DEVICE
Filed Sept. 12, 1949     3 Sheets-Sheet 2
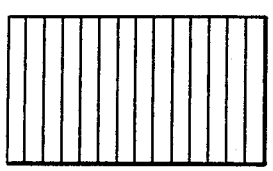
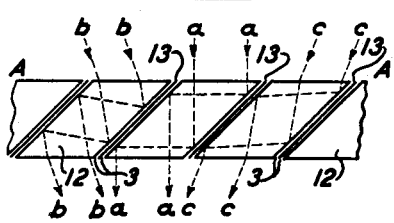
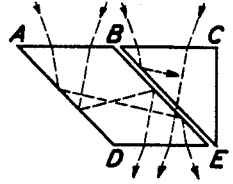
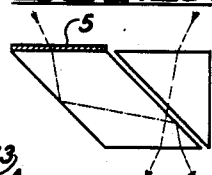
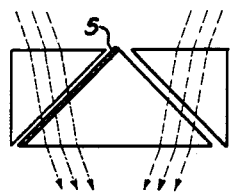
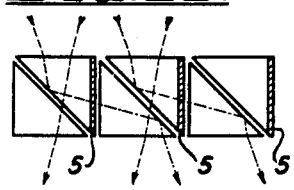
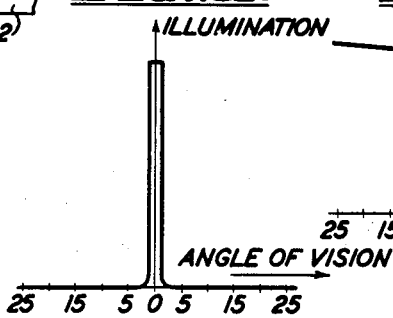
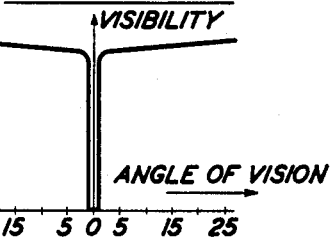
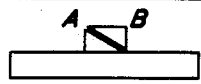
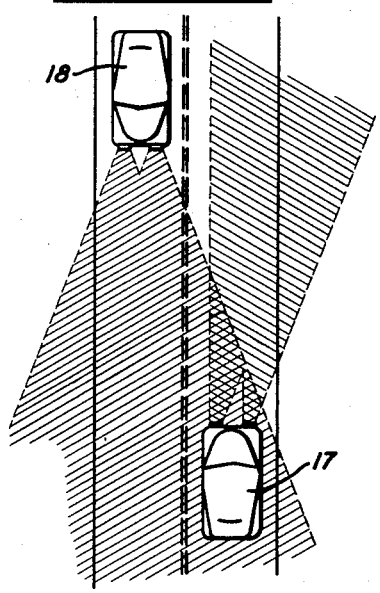
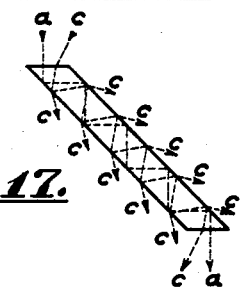
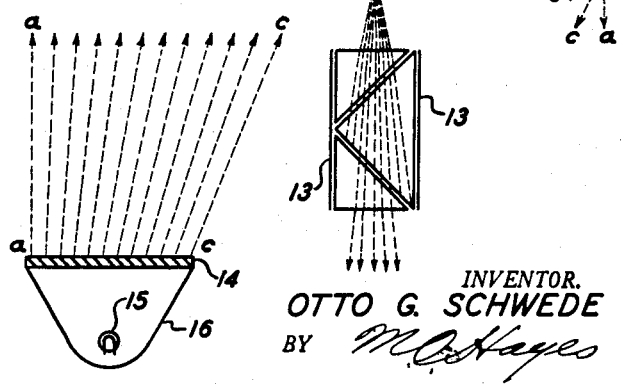
INVENTOR.
OTTO G. SCHWEDE
BY
ATTORNEY

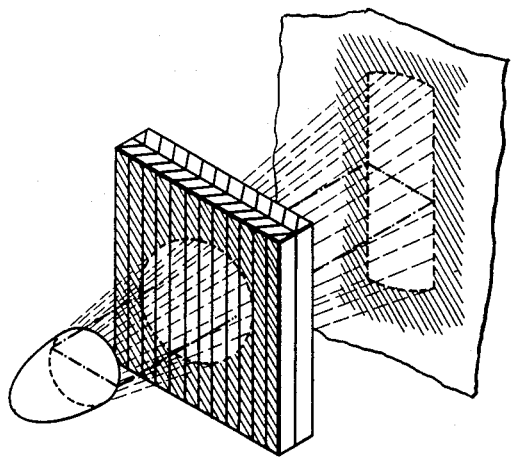
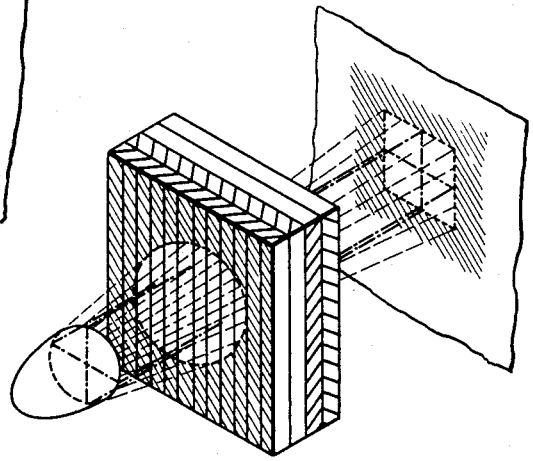
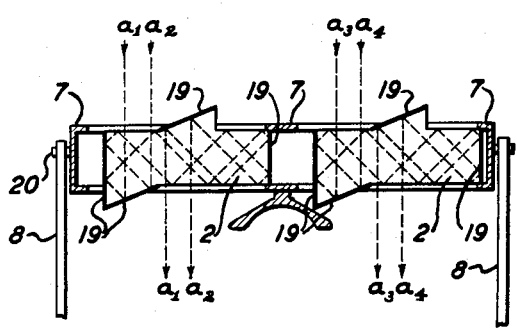
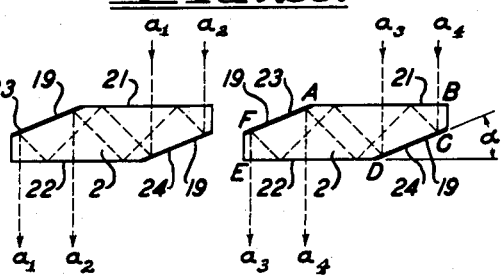
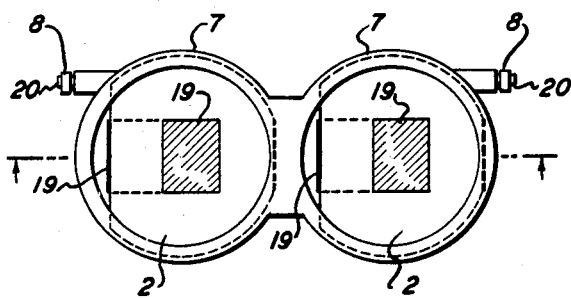
INVENTOR.
OTTO G. SCHWEDE

United States Patent Office 2,722,862
Patented Nov. 8, 1955

2,722,862

ANGULAR DISCRIMINATING OPTICAL DEVICE

Otto G. Schwede, Camarillo, Calif.

Application September 12, 1949, Serial No. 115,306

1 Claim. (Cl. 88—1)

(Granted under Title 35, U. S. Code (1952), sec. 266)

This invention relates to a new and useful glare protector. One of the objects of my invention is to obtain an optical device which, like spectacles, may be worn by a car driver or may be attached to the observation window of a vehicle and through which the driver of said vehicle may look. In this manner he can at night observe the road without being blinded by the dazzling headlights of cars approaching him in the opposite lane. The glare protector may also be adjusted in a manner which prevents blinding by a low sun, etc.

Another modification of this optical device according to my invention may be attached to the glaring headlights of a vehicle to eliminate the dangerous glare of scattered rays and to produce a light beam with sharp boundaries. This light beam now may be adjusted in such a manner that, while the lane in which the vehicle moves is fully illuminated, the driver of an approaching car will not be blinded.

A comparison between a glare protector according to my invention and the known devices using polarized light shows the following advantageous features inherent in my device:

1. A car driver may protect himself regardless of whether the approaching car is equipped with such a device or not.

2. The illumination and visibility within the driver's own lane are not decreased as is the case with polarized light. Therefore, no bigger power generators and light bulbs are required.

It is obvious that such a device increases directly the safety of night driving by equally providing a better vision for the driver of a car equipped with this device and the driver of a vehicle approaching said car and indirectly by reducing the strain exerted on the eyes of a driver by blinding headlights.

The general idea of the glare protector according to my invention is based on the fact that only the scattered light rays of an approaching bright headlight blind a driver. These light rays when entering the eye affect the visibility in two ways. First, the weak impressions due to useful reflections from objects ahead of the driver are overpowered by the powerful direct light transmission from the approaching headlights. Second, the mechanism of the human eye automatically adjusts the pupil of the eye to the incoming total quantity of light. Consequently, an approaching powerful headlight automatically restricts the pupil which is normally wide open during the night to a very small effective area; with an additional weakening of the useful light impressions as a result. The well known impression of the road ahead of a blinded driver is that of a black wall with two bright lights in it.

A similar but far weaker effect can be observed during the hours of low sun. The position of the sun, however, is fortunately not always just ahead of the driver, so he can protect himself by a sun visor. However, the principle of the sun visor cannot directly be applied to night driving because the light source is almost at the same level as the road and the difference in angles of vision is very small between light source and the section of the road which must be observed. A shade or light filter placed before a driver and capable of effective darkening of the disturbing headlights consequently would either darken the driver's own lane to a considerable degree or would not be effective at all.

Only an optical device designed so that a very sharp boundary between darkened and unaffected field of vision exists can solve the problem. With such a device a driver is able to cut out just the disturbing light source and still see his own lane and part of the approaching car undisturbed and clearly. The same device attached to his own headlights would restrict the light beam to the section of the road which he must see leaving the opposite section dark so that an approaching driver cannot be blinded.

The foregoing and other objects of my invention will be best understood by reference to the following description of exemplifications thereof, taken in connection with the accompanying drawings, wherein.

Figure 3A:
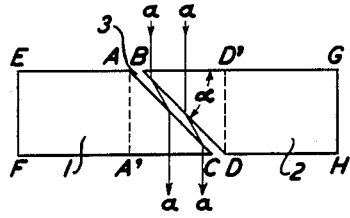
Figure 4:
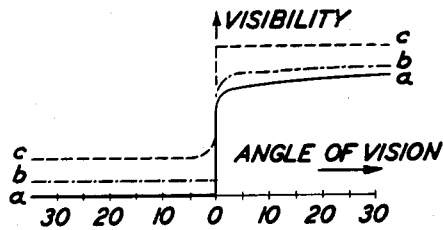
Figure 5:
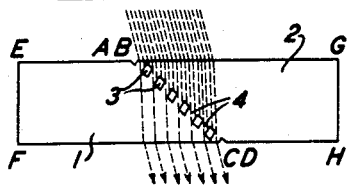
Figures 6A, 6B:
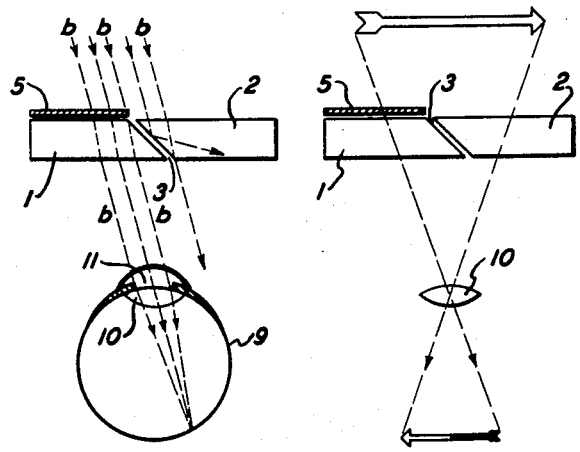
Figure 10:
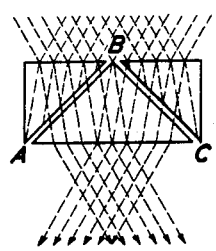

Figs. 3a, b, and c show an enlarged optical part with selected light paths drawn in;

Fig. 4 is a diagram illustrating the relation between visibility and angle of vision;

Fig. 5 shows an enlarged optical part of a possible modification with a bundle of selected light rays drawn in;

Figs. 6a and b illustrate the combined action of a spectacles type glare protector and the human eye;

Fig. 7 represents a horizontal sectional view of a pane type glare protector;

Fig. 8 is the front view of the pane type glare protector shown in Fig. 7;

Fig. 9 shows a horizontal sectional view of an enlarged section of a pane type glare protector;

Fig. 10 is an enlarged optical part of a possible modification with two selected bundles of light rays drawn in;

Fig. 10a is a diagram illustrating the effect of a combination as shown in Fig. 10 on visibility vs. angle of vision;

Fig. 11 shows a combination of prisms according to a possible modification;

Fig. 12 is the modification shown in Fig. 10 with an additional light filter;

Fig. 13 is the modification shown in Fig. 11 with an additional light filter;

Fig. 14 refers to a possible modification with light absorbing filters;

Fig. 15 is an optical part of a possible modification utilizing multiple reflections, two selected light rays being drawn in;

Fig. 16 illustrates the combination of a small glare protector as shown in Fig. 5 with an eye glass;

Fig. 17 is an optical part of a modification which transmits only light rays within a limited angular range;

Fig. 18 illustrates the effect of a glare protector attached to the headlights of a car on the illumination of a road;

Fig. 19 shows a combination of a normal searchlight and a glare protector;

Fig. 20 illustrates the effect of a combination of two pane type glare protectors on the light emitted from a normal searchlight;

Fig. 21 is a diagram illustrating the relation between illumination and angle of vision obtained by the combination shown in Fig. 20;

Fig. 22 illustrates the effect of a combination of four pane type glare protectors on the light emitted from a normal search light;

Fig. 23 shows two eyepieces of a spectacles type glare protector;

Fig. 24 is a cross sectional view of a spectacles type glare protector; and

Fig. 25 is the front view of the glare protector shown in Fig. 24.

The drawings show the underlying principles rather than design measurements. Unessential parts have been omitted.

Referring more particularly to Figs. 3a, b, and c, the underlying principle is explained in a simple manner. Fig. 3a shows the cross section of an optical device for separation of light rays with different angles of incidence. This device comprises a transparent body 2 which has a surface BD located within the path of the light rays in such a manner that light rays with angles of incidence greater than a predetermined angle are totally reflected and light rays with angles of incidence smaller than that predetermined angle are transmitted. Compensation of the angular deflection of the transmitted light rays is effected by the transparent body 1 particularly its surface AC which is separated from the surface BD by a transparent lamina 3 having a refractive index smaller than that of the transparent bodies 1 and 2.

Figure 3B:
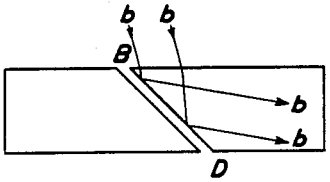

In particular 1 and 2 represent two prisms of glass vertical to the plane of the drawing, the cross sections of which are the trapezoids EACF and BGHD. Between both prisms is a very thin lamina 3 of air or another transparent medium. Bundles of light rays of different angles of incidence a—a, b—b, and c—c coming from the obects in the field of vision hit the surfaces EA and BG. Referring to the rays hitting the surface BD' in Fig. 3a, the rays perpendicular to BD' are identified by a—a. In Fig. 3b, the rays inclined to the left are identified by b—b, and in Fig. 3c, the rays inclined to the right are identified by c—c. In Fig. 3a, the perpendicular rays a—a pass the prism BGHD without being deflected and arrive at the inclined surface BD. Here they are partially reflected and partially transmitted. The transmitted part of the rays is deflected from its original direction to the right.

Figure 3C:
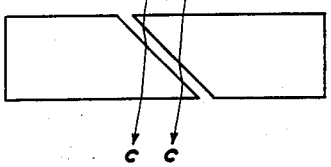

After passing the lamina 3 they arrive at the inclined surface AC of the prism EACF. Here they are again partially reflected and transmitted. The transmitted part of the rays is deflected so that the rays become parallel to their original direction of incidence. The optical refractive index of the glass and the angle of the prisms have values such that the rays a—a become "critical rays." Therefore, rays coming from the left, as the rays b—b in Fig. 3b, even if forming only a very small angle with the rays a—a, will be reflected totally at the surface BD and not transmitted through the surface BD. Rays coming from the right, as the rays c—c in Fig. 3c, are transmitted through both prisms retaining their original direction of incidence. The loss of energy of the rays coming from the right, because of partial reflections, is small. Therefore, a very sharp separation of the rays will occur distinguishing between rays coming from the right and left side of the field of vision.

On looking through such an optical device the entire left half of the field of vision will appear dark and only obects in the right field of vision are visible. It is clear that such an optical device worn by a driver at a suitable distance in front of his eyes, will allow him to see one half of the road, i. e. the lane in which he is driving, with good visibility and protect him from dazzling headlights in the opposite lane. A turn of his head to the left, of course, will allow him to watch the other lane with the same clear visibility. In Fig. 4 curve a, the visibility is plotted vs. the angle of incidence.

At first blush it might appear that the same result could be obtained by merely shielding the left half of the driver's field of vision with a screen or filter. Such a device, however, would have many disadvantageous features. Some of them will be discussed here, because such a discussion will clearly show the improvements inherent in my invention.

First, a shade which gives the same sharp separation between left and right must be placed at a great distance before the eyes because of the finite diameter of the pupil of the eye. In addition, two partitions, one extending from the nose, the other from the left temple to the screens, have to be provided. These partitions narrow the useful field of vision like blinders. Second, the eyes of a driver would always be irritated by these close obects brought directly into his field of vision. Increased inconvenience and increased insecurity would be the result.

In direct contrast to the latter hypothetical device, the glare protector according to my invention avoids all these disadvantageous features. It can be placed close to the eyes like convenient spectacles. It yields a full view in the useful field of vision; and because of its optical properties, does not irritate the eyes.

A certain modification described hereinafter permits also limited observation of the opposite lane without being blinded by dazzling headlights in the lane. The principle of this modification consists in allowing a small amount of light from the left side to pass through the prisms. In this way, the headlights of approaching cars are seen as dim lights which will not blind the driver and affect the visibility of his own lane but will allow him to watch countertraffic. One of the many possible modifications for achieving this is described below with reference to Fig. 5.

This modification is the same optical device as described in Fig. 3 having in addition a plurality of small transparent bodies 4 in optical contact with the adjacent end surfaces AC and BD of the plates 1 and 2. The small transparent bodies 4 are embedded within the lamina 3 in such a manner that only at the points where these small bodies are located can light of all angles of incidence pass from the prism BGHD to the prism EACF. The result is that a certain amount of light coming from the left half can pass the prisms yielding a dim image of this half. The right half is as clear as before. The angular distribution of the visibility in the foregoing case is plotted as curve b in Fig. 4.

Figs. 6a and 6b refer to an optical device having a minimum thickness. It comprises two adjacent, coplanar transparent plates having substantially the same index of refraction, and a light absorbing filter which covers the left plate. The adjacent end surfaces of said plates are parallel and oriented at an oblique angle with respect to the plane of the plates. They are separated by a transparent lamina 3 which has an index of refraction less than that of said plates. The plates are shaped like eyeglasses. In Fig. 6a the left plate is 1; the right plate is 2; 9 is the eye; 10 is the lens of the eye; 11 is the pupil of the eye; and 5 is a light absorbing filter. The rays coming from the right half reach the eye without interference. The rays b—b coming from the left half are weakened because the part which passes both plates 1 and 2 is greatly reflected and the other part which passes only the left plate 1 is greatly absorbed by the light absorbing filter 5. The thickness of the plates may be reduced so far that the projection of the lamina is just as wide as the pupil when adapted to the dark. Fig. 6b is a schematic drawing of an object, the glare protector, the lens of the eye, and the image formed within the eye. The image of the arrowhead and the front half of the arrow is bright; the image of the feather and the rear half of the arrow is very dark.

Figure 2:
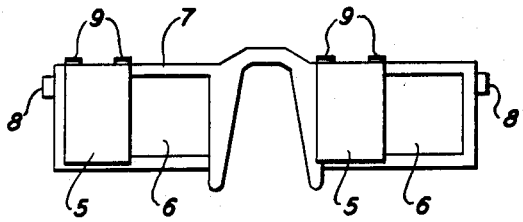
Fig. 2 is the front view of the glare protector shown in Fig. 1.
Figure 1:
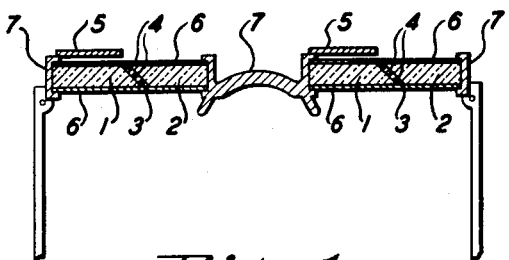
Fig. 1 is a horizontal cross sectional view of a spectacles-type glare protector.

Figs. 1 and 2 refer to eyeglasses according to the previously described principles of the invention. This optical device comprises principally a spectacle frame adapted to be worn by a human being adjacent to the head, therein being mounted a pair of coplanar transparent plates as described before, and means for adjusting the position of said plates in said frame.

Fig. 1 shows a horizontal cross sectional view. 1 is the left part of each eyeglass; 2 is the right part of each eyeglass; 3 is the lamina; 4 are the embedded bodies; 6 are thin glasses glued upon the eyeglasses to protect them against dirt and to assure greater rigidity; 5 is a dark filter. The filter can be turned upward for obtaining normal vision. 7 is the frame, supporting both optical systems; 8 are the temple pieces. Fig. 2 shows a front view, where like numerals identify like parts. 9 are the hinges which permit the filter 5 to turn upwards. In order to assure greater versatility the optical part of the glare protector described in the foregoing may be designed in such a manner that it is turnable in its own plane and may be tilted up and down. Such a modification would be useful as a sun visor. A modification of the eyepiece which was described in the foregoing would be to grind optically the surfaces in order to provide optical correction.

The glare protector may also be designed to form a flat composite pane comprising a plurality of similarly shaped transparent bodies, each body having a surface located within the path of the light rays in such a manner that light rays with angles of incidence greater than a predetermined angle are totally reflected and light rays with angles of incidence less than that predetermined angle are trasmitted. The pane may be attached to a vehicle in such a manner as to enable the driver to look through the glare protector if he desires to.

Referring to the accompanying figures, Fig. 7 represents a horizontal sectional view of a pane type glare protector. Fig. 8 represents the front view of the pane. Fig. 9 represents a horizontal sectional view of an enlarged section of the pane. Referring more particularly to Fig. 9, the underlying principle of this design of the pane type glare protector will be explained briefly. It is a modification of the principle underlying Fig. 3. In Fig. 9 compensation of the angular deflection of the totally reflected light rays is achieved by means of a second totally reflective surface, whereas in Fig. 3, compensation of the angular deflection of transmitted light rays is achieved by a transmitting surface.

It is obvious that the spectacles type also may be designed according to the principle underlying Fig. 9 and inversely the pane type also according to the principle underlying Fig. 3. According to Fig. 9 the pane is composed of a quantity of small prism elements 12. 3 are laminas, 13 are black absorbing foils. The rays perpendicular to the front surface A—A are identified by $a$—$a$. The rays inclined to the left are identified by $b$—$b$. The rays inclined to the right are identified by $c$—$c$. In Fig. 9 typical bundles of rays hitting different prisms are shown. It should be understood, however, that they hit all the prisms but are drawn in this manner for illustrative purposes. The rays $a$—$a$ are critical rays. They are twice totally reflected at the inclined surfaces and leave the prisms at the same angle as the angle of incidence without any additional loss of light energy. The same happens to the rays $c$—$c$. The rays $b$—$b$ are twice partially reflected at the inclined surfaces and leave the prisms at B—B with an additional loss of light energy. The part of the rays which is transmitted at the inclined surfaces is absorbed by the blackened foils 13. The resulting angular distribution of the visibility is plotted in Fig. 4 as curve $c$.

Referring to the drawings 10 to 17, additional modifications of and supplements to the principle are described. Fig. 10 refers to a combination of prisms in which the rays coming from the right can pass only through the right prism and the rays coming from the left can pass only through the left prism even though hitting both prisms.

An application of this combination of prisms makes it possible to obtain a dark area of any desired angular width and at any desired location within the field of vision by means of a suitable selection of the prism angle. For example, it is possible to darken the center of the field of vision without affecting the surrounding areas. The visibility versus the angle of incidence is plotted in Fig. 10a. In this respect it is possible to observe an arc welding procedure without the handicap of a darkened surrounding area, because only the arc is dimmed by the glasses whereas the surrounding area is observed with normal visibility. The same applies when observing other finite bright sources of light.

Fig. 11 refers to another combination of prisms in which the rays coming from the left may pass through only if they enter at the surface A—B. Rays coming from the right can always pass entering at A—B or B—C. Fig. 12 refers to a combination of prisms according to Fig. 10 with an additional light absorbing filter 5 to attenuate the rays coming from the left. Fig. 13 refers to a combination of prisms according to Fig. 11 with an additional light absorbing filter 5 to attenuate the rays coming from the left. Fig. 14 refers to a combination of prisms according to Fig. 5 with light absorbing filters 5 to attenuate undesired rays. Fig. 15 refers to an optical prism as part of a glare protector shaped in such a manner as to permit any desired ratio of visibility of the left and right half of the field of vision. The orientation of the reflecting surfaces in relation to each other and to the entrance and exit face is such that the resulting multiple reflection affects only the intensity of the partially reflected light rays $c$—$c$. The rays $a$—$a$ are always totally reflected and, therefore, not attenuated at all.

Fig. 16 refers to a combination of small prisms according to Fig. 5 and of an eye glass. The dimensions of the prisms are approximately equal to the dimensions of the pupil of the human eye when adapted to the dark. Fig. 17 refers to a combination of prisms which only transmits rays within a limited range of the angle of incidence. By combining two of the pane type glare protectors (Fig. 20) one limiting the left side of the beam of light and one limiting the right side of the beam, it is possible to obtain an angular distribution of the visibility or illumination in the horizontal plane as shown by Figure 21.

Only a small angular area has full visibility or illumination whereas the remaining area may be darkened to any desired degree. To limit the light beam in the vertical plane, another pane type glare protector as described by Fig. 20 may be added. The prism elements of this other pane form an angle of 90 degrees with the prism elements of the first pane. Therefore, the passing beam is limited in both the horizontal and vertical plane as shown in Fig. 22 for a set of four panes. An example of application would be the sharpening of the beam of a poorly designed searchlight which completely eliminates undesirable scattering of the light. Coating of the reflecting surfaces will be an additional improvement. The lamina between the several prisms may also be filled with a medium having a refractive index which is smaller than that of the prisms and larger than that of air. It will be understood that the material of the prisms is not restricted to glass. Furthermore, the described principle should not be restricted to the half-and-half division of the field of vision, but can also be applied to divide the field of vision into more than two parts.

Another useful application of the described principle will be obtained by reversing the direction of the light rays, i. e., by providing a source of light such as a searchlight in place of the human eye. In such an arrangement, the light beam emitted by the searchlight has a very sharp boundary at the left side and can be adjusted in such a manner that only the right lane of the road is fully illuminated and the left lane is left dark. Therefore, the drivers of the approaching cars are not blinded even if the searchlight of the car so equipped is on full power. It is obvious that in this way the safety of night driving will be greatly increased because the driver is not required to dim his lights at the very critical moment before passing the other car. Fig. 18 shows the situation in a simplified sketch. The car 17, equipped with the new searchlight, covers only its own lane with full power without blinding the drivers of the approaching cars, whereas car 18, with ordinary headlights, covers both lanes and blinds the driver of car 17.

Fig. 19 refers to a modification of an ordinary headlight by providing an angle limiter based on the described principle. 15 is an electric bulb; 16 is the parabolic reflector; 14 is a pane type glare protector according to one of the above described modifications. The ray $a$—$a$ forms the left boundary of the light beam and is parallel to the center line of the road. The ray $c$—$c$ is the right boundary of the light beam. The effect is apparent. Turning the pane 14 90 degrees in its own plane results in cutting off the part of the light rays which radiate at angles raised above the horizontal plane. The road itself will be illuminated as with ordinary headlights, but the eyes of the driver of the approaching car are not hit by scattered light rays. Consequently, the driver of a car equipped with such a device is not required to dim his lights because of approaching cars.

Two modifications of the spectacles type glare protector utilizing multiple reflections as described in Fig. 15 are illustrated in Figs. 23, 24, and 25. Fig. 23 shows two eyepieces of a spectacle. 2 is the effective optical body for the separation of light rays with different angles of incidence. For this particular example the index of refraction N of said body 2 was chosen as $N=\sqrt{2}$. Said optical body 2 has two plane parallel surfaces 21 and 22, and two surfaces 23 and 24 which are covered by mirrors 19. Mirrors 19 are of a conventional type and comprise a smooth metallic surface thereby providing metallic reflection. The expression "metallic reflection" as used in the art designates a surface which reflects all light rays falling thereon and does not transmit the light rays, regardless of the angle of incidence of the rays. Said surfaces 21 and 22 are oriented at an angle of 22½° in respect to the surfaces 23 and 24. All incoming light rays are reflected at the surface 24 by the mirror 19 and hit the surface 23 which is located within the path of said light rays. Light rays perpendicular to the plane of the optical body 2, upon being reflected by mirror 19, hit the surface 21 at an angle of incidence of 45°. Because the index of refraction $N=\sqrt{2}$, the angle of incidence of 45° is identical to the predetermined angle. Therefore, light rays which hit the surface 21 with angles of incidence greater than said predetermined angle are totally reflected and light rays with angles of incidence smaller than said predetermined angle are partially transmitted and partially reflected. The other surface 22 is parallel to the surface 21 and located within the path of the reflected light rays so that a multiple reflection results. That multiple reflection affects only the intensity of the partially reflected light rays. The reflected light rays finally hit the mirror 19 on the surface 23 and are deflected in such a manner that they again attain their original angles of incidence.

Fig. 24 shows a cross sectional view of a spectacles type glare protector. It comprises as principal parts: the optical bodies 2, the spectacle frame 7, the temple pieces 8, the mirrors 19, the joints 20, permitting the frame with the optical bodies to be turned upwards. Fig. 25 shows the front view of this glare protector, where like numbers denote like parts as in Fig. 24. As is indicated in Fig. 25, the optical bodies 2 are shaped like flat discs, two opposite parts of the circumference being ground to form accurate planes upon which the mirrors 19 may be secured. The frame 7 has an annular shape permitting rotation of the optical bodies 2 within their plane.

It is understood that the light absorbing filters may be replaced by surfaces covered with a number of small metallic mirrors spaced at a suitable distance apart.

Furthermore it is understood that the reflection from any reflective surface may be changed by adding small metallic mirrors spaced at a suitable distance apart.

While I have disclosed certain preferred embodiments of my invention, it is apparent that many modifications may be made in the form, arrangement, and number of elements disclosed therein. In particular, although the description given has been concerned mainly with a glare protector, it is obvious that the invention is equally applicable in connection with any optical device requiring a sharp discrimination between light rays of different angles. I therefore aim in the appended claim to cover this and all such equivalent variations of application and structure as are within the true spirit and scope of the foregoing disclosure.

The invention described herein may be manufactured and used by or for the Government of the United States of America for governmental purposes without the payment of any royalties thereon or therefor.

I claim:

An optical device comprising a single body of transparent material having an entrance face, an emergent face parallel thereto and laterally spaced therefrom; said entrance and emergent faces having totally reflective internal surfaces, two planar parallel mirrors positioned at an oblique angle to said entrance face of substantially one half the critical angle of said material, whereby the sine of the critical angle is substantially equal to the reciprocal of the index of refraction of said material, one of said mirrors beings disposed opposite the entrance face in the path of the light rays entering said entrance face in a manner to reflect said light rays back to said totally reflective entrance face and the other mirror being disposed opposite the emergent face in the path of the light rays reflected from said totally reflective emergent face in a manner to restore said rays to their original direction, whereby rays having an angle of incidence less than the critical angle with respect to said totally reflective surfaces are attenuated by multiple reflections therefrom and rays having an angle of incidence greater than the critical angle with respect to said totally reflective surfaces are multiple reflected therefrom and transmitted through said transparent body with substantially no decrease in intensity.

References Cited in the file of this patent

UNITED STATES PATENTS

| | | |
|---|---|---|
| 1,458,635 | Whitney | June 12, 1923 |
| 1,719,154 | Wetherbee et al. | July 2, 1929 |
| 2,026,675 | Edwards | Jan. 7, 1936 |
| 2,211,238 | Links | Aug. 13, 1940 |

FOREIGN PATENTS

| | | |
|---|---|---|
| 30,925 | Great Britain | Dec. 31, 1897 |
| 297,989 | Germany | Sept. 8, 1919 |
| 429,340 | Great Britain | May 27, 1935 |
| 458,509 | Great Britain | Dec. 14, 1936 |